(12) United States Patent
Hunsberger et al.

(10) Patent No.: US 11,126,913 B2
(45) Date of Patent: Sep. 21, 2021

(54) METHODS AND SYSTEMS FOR IMPLEMENTING DEEP SPIKING NEURAL NETWORKS

(71) Applicant: Applied Brain Research Inc., Waterloo (CA)

(72) Inventors: Eric Gordon Hunsberger, Waterloo (CA); Christopher David Eliasmith, Waterloo (CA)

(73) Assignee: Applied Brain Research Inc, Waterloo (CA)

(*) Notice: Subject to any disclaimer, the term of this patent is extended or adjusted under 35 U.S.C. 154(b) by 615 days.

(21) Appl. No.: 14/807,265

(22) Filed: Jul. 23, 2015

(65) Prior Publication Data
US 2017/0024661 A1    Jan. 26, 2017

(51) Int. Cl.
| | | |
|---|---|---|
| *G06N 3/08* | (2006.01) | |
| *G06N 20/00* | (2019.01) | |
| *G06N 3/04* | (2006.01) | |
| *G06N 3/10* | (2006.01) | |

(52) U.S. Cl.
CPC ............... *G06N 3/08* (2013.01); *G06N 3/049* (2013.01); *G06N 20/00* (2019.01); *G06N 3/10* (2013.01)

(58) Field of Classification Search
CPC .......... G06N 3/08; G06N 3/049; G06N 20/00; G06N 3/10
See application file for complete search history.

(56) References Cited

U.S. PATENT DOCUMENTS

| | | | | |
|---|---|---|---|---|
| 5,479,571 | A * | 12/1995 | Parlos | G06N 3/049 706/25 |
| 8,515,885 | B2 * | 8/2013 | Modha | G06N 3/063 706/16 |
| 10,387,774 | B1 * | 8/2019 | Cao | G06N 3/08 |
| 2010/0312736 | A1 * | 12/2010 | Kello | G06N 3/04 706/25 |
| 2011/0106741 | A1 * | 5/2011 | Denneau | H04L 47/521 706/25 |
| 2013/0151448 | A1 | 6/2013 | Filip | |
| 2013/0204819 | A1 * | 8/2013 | Hunzinger | G06N 3/049 706/25 |
| 2015/0269481 | A1 * | 9/2015 | Annapureddy | G06N 3/0445 706/21 |
| 2015/0269485 | A1 * | 9/2015 | Julian | G06N 3/049 706/25 |
| 2016/0196488 | A1 * | 7/2016 | Ahn | G06N 3/063 706/41 |

OTHER PUBLICATIONS

Gruau, F., Ratajszczak, J. Y., & Wiber, G. (1995). A neural compiler. Theoretical Computer Science, 141(1-2), 1-52. (Year: 1995).*

(Continued)

*Primary Examiner* — Ann J Lo
*Assistant Examiner* — Oluwatosin O Alabi
(74) *Attorney, Agent, or Firm* — Erise IP, P.A.

(57) ABSTRACT

A method for implementing spiking neural network computations, the method including defining a dynamic node response function that exhibits spikes, where spikes are temporal nonlinearities for representing state over time; defining a static representation of said node response function; and using the static representation of the node response function to train a neural network. A system for implementing the method is also disclosed.

11 Claims, 5 Drawing Sheets

(56) References Cited

OTHER PUBLICATIONS

Maass, W., Joshi, P., & Sontag, E. D. (2007). Computational aspects of feedback in neural circuits. PLoS computational biology, 3(1), e165. (Year: 2007).*

Stewart TC, Eliasmith C. Large-scale synthesis of functional spiking neural circuits. Proceedings of the IEEE. May 2014;102(5):881-98. (Year: 2014).*

MacNeil, D., & Eliasmith, C. (2011). Fine-tuning and the stability of recurrent neural networks. PloS one, 6(9). (Year: 2011).*

MacNeil, D., & Eliasmith, C. (2011). Fine-tuning and the stability of recurrent neural networks. PloS one, 6(9), e22885. (Year: 2011).*

Eliasmith, C. (2007). How to build a brain: From function to implementation. Synthese, 159(3), 373-388. (Year: 2007).*

Schrauwen, B., & Van Campenhout, J. (Jul. 2006). Backpropagation for population-temporal coded spiking neural networks. In The 2006 IEEE International Joint Conference on Neural Network Proceedings (pp. 1797-1804). IEEE. (Year: 2006).*

Evangelos Stromatias et al: "Robustness of spiking Deep Belief Networks to noise and reduced bit precision of neuro-inspired hardware platforms", Frontiers in Neuroscience, vol. 9, Jul. 9, 2015 (Jul. 9, 2015), pp. 1-14.

Peter U. Diehl et al: "Fast-classifying, 1-15 high-accuracy spiking deep networks through weight and threshold balancing", 2015 International Joint Conference on Neural Networks (IJCNN), Jul. 1, 2015 (Jul. 1, 2015), pp. 1-8.

Cao Yongqiang et al: "Spiking Deep Convolutional Neural Networks for Energy-Efficient Object Recognition", International Journal of Computer Vision, Kluwer Academic Publishers, Norwell, US, vol. 113, No. 1, Nov. 23, 2014 (Nov. 23, 2014), pp. 54-66.

Jir Prg A-S Prg A-Ma Ed-Mario Ko [Paragraph] Ppen et al: "Gradient Learning in Networks of Smoothly Spiking Neurons", Nov. 25, 2008 (Nov. 25, 2008), Advances in Neuro-Information Processing, Springer Berlin Heidelberg.

Emre Neftci et al: "Event-driven contrastive divergence for spiking neuromorphic systems", Frontiers in Neuroscience, vol. 7, No. 272, Jan. 30, 2014 (Jan. 30, 2014), XP055218818, DOI: 10.3389/fnins.2013.00272.

* cited by examiner

METHODS AND SYSTEMS FOR IMPLEMENTING DEEP SPIKING NEURAL NETWORKS

FIELD OF THE INVENTION

The system and methods described herein are generally directed to computing using single or multi-layer spiking neural networks. The methods described here are specifically directed at learning efficient, accurate implementations of feedforward or recur-rent deep networks using temporally discontinuous nodes (i.e., 'spiking neurons').

BACKGROUND

Deep artificial neural networks (ANNs) have recently been very successful at solving image categorization problems. Early successes with the Mixed National Institute of Standards and Technology (MNIST) database were expanded to the more difficult but similarly sized Canadian Institute for Advanced Research 10 category (CIFAR-10) dataset and Street-view house numbers (SVHN) dataset. More recently, many groups have achieved better results on these small datasets as well as success on larger datasets. This work culminated with the application of deep neural networks to ImageNet (see A. Krizhevsky, I. Sutskever, and G. Hinton, Imagenet classification with deep convolutional neural networks, in Advances in Neural Information Processing Systems, 2012), a very large and challenging dataset.

The relative success of deep ANNs in general—and convolutional neural networks in particular—on these datasets have put them well ahead of other methods in terms of image categorization by machines. Given that deep ANNs are approaching human performance on some datasets (or even passing it, for example on MNIST) suggests that these models may be able to shed light on how the human visual system solves these same tasks.

There has recently been considerable effort to take deep ANNs and make them more biologically plausible by introducing neural "spiking", such that connected nodes in the network transmit information via instantaneous single bits (spikes), rather than transmitting real-valued signals. While one goal of this work is to better understand the brain by trying to reverse engineer it, another goal is to build energy-efficient neuromorphic systems that use a similar communication method for image categorization. Previous approaches to implementing deep networks with spiking neurons rely on assuming that the neural spiking is generated by an integrate-and-fire neuron. This is a simple, non-biologically plausible model that is seldom implemented in neuromorphic hardware. Some previous approaches assume you have more than one spiking neurons per node in the deep network being implemented. A system that is able to be employed with a wider variety of dynamic spiking neural models would be more flexible. A system that is able to use a single spiking neuron per deep network node would be more efficient. Such a design could provide more efficient implementations of a wider variety of deep neural networks and allow a wider range of hardware implementations.

SUMMARY

In a first aspect, some embodiments of the invention provide a method for designing a system for implementing single or multilayer spiking neural network computations based on statically trained networks. The method includes defining any node response function that exhibits brief temporal nonlinearities for representing state, i.e., 'neural spikes'. This response function is dynamic because the nonlinearity is temporal. A static response function is one which maps directly from an input state to an output state without dynamics being considered (e.g., a sigmoid). The method also includes defining a static version of the dynamic node response function and employing the static version of the response function to train a neural network using any available training method, resulting in neural connection weights. It is then possible to use those connection weights in a dynamically implemented spiking neural network to compute the function trained for.

In some cases, the initial couplings and connection weights are determined using a neural compiler.

In a second aspect, some embodiments of the invention provide a system for pattern classification, data representation, or signal processing in spiking neural networks. The system includes one or more input layers presenting a vector of 1 or greater dimensions, as well as zero or more intermediate layers coupled via weight matrices to at least one of the input, other intermediate, or output layers and one or more output layers generating a vector representation of the data presented at the input layer. Each layer comprises a plurality of nonlinear components, wherein each nonlinear component is configured to generate temporally brief outputs at each moment in time in response to the input (i.e., a 'spike') and is coupled to the output module by at least one weighted coupling. The output from each nonlinear component is weighted by the connection weights of the corresponding weighted couplings and the weighted outputs are provided to the output module to form the output modifier. The output from each nonlinear component may be filtered by a connection filter between that component and others it is connected to. The connection weights are determined using methods of the first aspect.

In some cases, the input to the system is either discrete or continuous in time and/or space.

In some cases, the input to the system can be scalar or a multidimensional vector.

BRIEF DESCRIPTION OF THE DRAWINGS

A preferred embodiment of the present invention will now be specified in detail with reference to the drawings.

DESCRIPTION OF EXEMPLARY EMBODIMENTS

Figure 1:
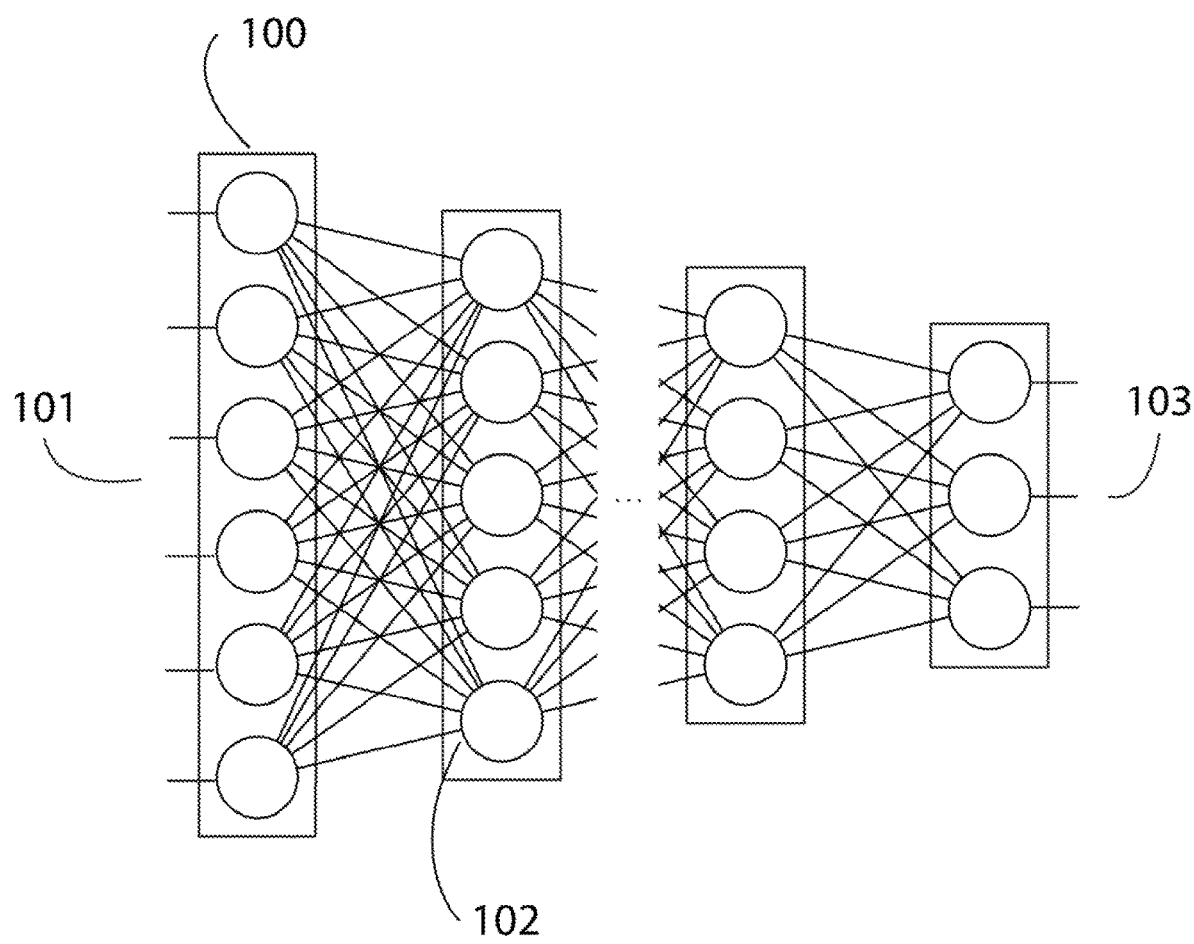
FIG. 1 is a block diagram of layers and nonlinear spiking elements in accordance with an example embodiment.

Herein, numerous specific details are set forth in order to provide a thorough understanding of the exemplary embodiments described. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as presented here for illustration.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. In certain embodiments, the computer may be a digital or any analogue computer.

Program code is applied to input data to perform the functions described herein and to generate output information. The output information is applied to one or more output devices, in known fashion.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., read-only memory (ROM), magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, nontransitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or random access memory (RAM), where the data stored thereon is only temporarily stored. The computer useable instructions may also be in various forms, including compiled and non-compiled code.

It should also be noted that, as used herein, the wording and/or is intended to represent an inclusive-or. That is, X and/or Y is intended to mean X or Y or both, for example. As a further example, X, Y, and/or Z is intended to mean X or Y or Z or any combination thereof.

Embodiments described herein generally relate to a system and method for designing and implementing a shallow or deep feedforward or recurrent spiking neural network. Such a system can be efficiently implemented on a wide variety of distributed systems that include a large number of nonlinear components whose individual outputs can be combined together to implement certain aspects of the system as will be described more fully herein below.

Examples of nonlinear components that can be used in various embodiments described herein include simulated/artificial neurons, field-programmable gate arrays (FPGAs), graphics processing units (GPUs), and other parallel computing systems. Components of the system may also be implemented using a variety of standard techniques such as by using microcontrollers. Also note the systems described herein can be implemented in various forms including software simulations, hardware, or any neuronal fabric. Examples of mediums that can be used to implement the system designs described herein include Neurogrid (see S. Choudhary, S. Sloan, S. Fok, A. Neckar, Eric, Trautmann, P. Gao, T. Stewart, C. Eliasmith, and K. Boahen, Silicon neurons that compute, in International Conference on Artificial Neural Networks, 2012, pp. 12128.), Spinnaker (see M. Khan, D. Lester, L. Plana, A. Rast, X. Jin, E. Painkras, and S. Furber, SpiNNaker: Mapping neural networks onto a massively-parallel chip multiprocessor. IEEE, June 2008.), open computing language (OpenCL), and TrueNorth (see P. Merolla, J. V. Arthur, R. Alvarez-Icaza, A. S. Cassidy, J. Sawada, F. Akopyan, B. L. Jackson, N. Imam, C. Guo, Y. Nakamura, B. Brezzo, I. Vo, S. K. Esser, R. Appuswamy, Taba, A. Amir, M. D. Flickner, W. P. Risk, R. Manohar, and D. S. Modha, Artificial brains. A million spiking-neuron integrated circuit with a scalable communication network and interface. Science (New York, N.Y.), vol. 345, no. 6197, pp. 66873, August 2014.). As used herein the term 'neuron' refers to spiking neurons, continuous rate neurons, or components of any arbitrary high-dimensional, nonlinear, distributed systems.

To generate such systems we train a network employing static response functions on images using traditional deep learning techniques; we call this the static network. We then take the parameters (weights and biases) from the static network and use them to connect spiking neurons, forming the dynamic network (or spiking network). The challenge is to train the static network in such a way that a) it can be transferred into a spiking network, and b) the classification error of the dynamic network is as close to that of the static network as possible (i.e., the conversion to a dynamic network introduces as little performance error as possible).

FIG. 1 shows the general architecture of these networks. Each layer (100) consists of several nodes (102) that can be either spiking or non-spiking. The overall network structure can be quite varied, with layers connecting within or back to themselves (recurrent networks), or to other layers earlier or later than them in the network. Networks that connect only in one direction are called feedforward networks. Connections between layers may also be quite varied, including full connectivity, local connectivity, convolutional connectivity, or any other connectivity pattern. Regardless of the topology, the network takes some form of vector input (101) which it converts via its weighted, connected components to a different vector output (103), possibly changing the dimensionality. This figure represents the basic structure of both convolutional and non-convolutional networks. In the case of convolutional networks, there is extra structure imposed on the topology of the connections between layers. Convolutional networks have excellent performance on many machine learning tasks. Consequently, we use this kind of network in our example embodiment.

Figure 2:
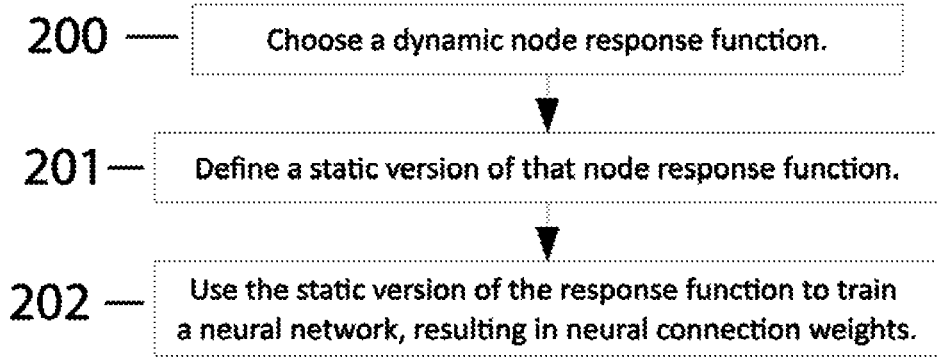
FIG. 2 is a diagram of the process involved in applying the method.
Figure 3:
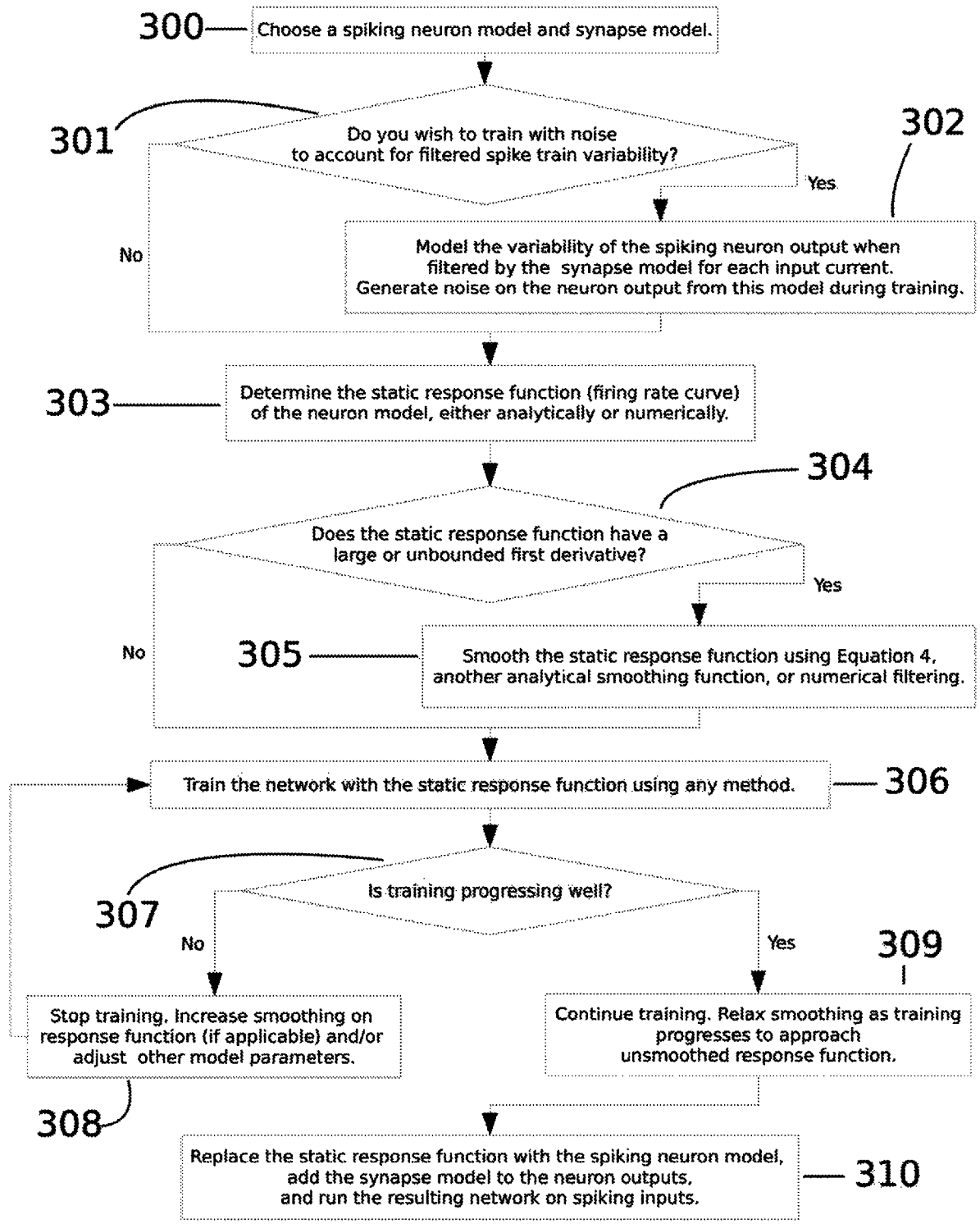
FIG. 3 is a diagram of the process involved in applying several of the variations of the method described herein.

We describe here a method for designing a system for implementing single or multi-layer, feedforward or recurrent spiking neural network computations, depicted in FIG. 2 and in more detail in FIG. 3. The first step in the method consists in defining any node response function that exhibits brief temporal nonlinearities for representing state over time, i.e., 'spikes' (200). There are a wide variety of example nonlinearities in the literature, including the Hodgkin-Huxley (HH) neuron, the Fitzhugh-Nagumo neuron, the exponential, quadratic, adaptive, or standard leaky integrate-and-fire (LIF) neuron, the integrate-and-fire neuron, the Wilson neuron, the lzhichevich neuron, among others. Various hardware implementations of these and other nonlinearities have also been proposed, for generating spike-like outputs. In addition, for certain embodiments a synapse model can be chosen (300) when smoothing and/or training with noise. There are a wide variety of synapse models in the literature, including exponential decay, the alpha-synapse, and conductance-based models.

The second step consists in determining a static version of that node response function (201). The methods used can depend on the dynamic model (303). For example, the standard LIF neuron has a closed form static description. In contrast, the adaptive LIF will require approximation of its temporally varying response function via weighted averaging or a similar method. Similarly, numerical simulation methods can be used to determine static approximations of more complex neuron models, like the HH model. Additionally, such static models may have a discontinuous, high, or unbounded derivative, which must be smoothed (304). We provide an example smoothing method below, and discuss a variety of smoothing and noise modeling methods. Smoothing typically requires choosing a synapse model. These should be chosen to match that used in the final dynamic simulation if one is to be performed.

The third step consists in employing the static version of the response function to train a neural network using any available training method, resulting in neural connection weights (202). The method for training is not restricted (306). In our example embodiment, we focus on recent state-of-the-art methods, including convolutional networks and denoising autoencoders. However, any standard method for training ANNs may be employed, including supervised, unsupervised, or reinforcement learning.

With this method, the connection weights determined in step three can be used in a dynamically implemented spiking neural network to compute the function trained for (310). This consists in running the dynamic neural model, where each neuron is connected to others by the synaptic dynamics weighted by the connection weights determined during ANN training. As shown in the example embodiment, this set of steps allows for good performance on the original task in the spiking network.

In this method, smoothing of the static nonlinearity can be performed using equation 4, an analytic smoothing function, or numerical filtering (305). This is often necessary if the derivative of the static response function is high or unbounded. Any of these methods will allow an approximation that will have a usable derivative for the purposes of employing standard learning methods. Application of smoothing can vary depending on how well training is progressing (308-309). The amount of smoothing can be reduced during training so that less error is introduced when converting to the dynamic response function (309).

In this method, the initial couplings and connection weights can be determined in any of a number of ways, including by using a neural compiler, like the methods of the Neural Engineering Framework (NEF). It is more common to use random weights, which will also often result in useful network.

In this method it is possible to introduce an adaptive rule that fine tunes the weights initially determined using this method. There are a wide variety of such rules that work in spiking neural networks, including spike-timing-dependent plasticity (STDP) rules, such as the prescribed error sensitivity (PES) rule (see T. Bekolay, Learning in large scale spiking neural networks, Masters, University of Waterloo, 2011.). These rules can be applied at any point during the simulation of the dynamic network.

This method can often be enhanced by training with noise that, at least in part, accounts for variability introduced by neural spiking (301-302). In our example embodiment, we demonstrate that training with noise on neuron outputs improved the performance of the spiking network. In that case, our additive Gaussian noise is a rough approximation of the variability that the spiking network will encounter. Using these same methods we can include training with noise that is more representative of the variability seen in spiking networks, to accommodate both the non-Gaussian statistics at any particular input current, and the changing statistics across input currents.

This method can be integrated with additional nonlinearities (e.g. computing the max function) or linearities (e.g., computing average pooling) in the network. In our example embodiment we demonstrate including additional linearities. Similar methods can be used to model nonlinearities as well. Using approximation to an arbitrary function (e.g, max pooling) by introducing a network topology into the spiking neurons (e.g., lateral inhibition) and simulating the effects of that topology on the input/output mapping provided by that group of neurons, for a wide range of static inputs to the neurons is one example. This static input/output mapping can then be used during the standard training of the static network to approximate that computation.

Example

We base our example network off that of Krizhevsky et al., which achieved 11% error on the CIFAR-10 dataset (a larger variant of the model won the ImageNet 2012 competition). The original network consists of five layers: two generalized convolutional layers, followed by two locally-connected non-convolutional layers, followed by a fully-connected softmax classifier. A generalized convolutional layer consists of a set of convolutional weights followed by a neural nonlinearity, then a pooling layer, and finally a local response normalization layer. The locally-connected non-convolutional layers are also followed by a neural nonlinearity. In the case of the original network, the nonlinearity is a rectified linear (ReLU) function, and both pooling layers perform overlapping max-pooling. Code for the original network and details of the network architecture and training can be found at https://code.google.com/p/cuda-convnet2/.

Past work has not demonstrated how to make static networks transferable to spiking neurons in general. The methods described herein address this problem. Some of these modifications simplify the network topology, but the central modifications relate to matching a dynamic neuron response function to a static one to allow effective training. In this example embodiment, we begin with topological changes to simplify the network being trained. These simplifications are not crucial to the invention, and are used here only for demonstration. First, we remove the local response normalization layers. This computation would likely require some sort of lateral connections between neurons, but for this demonstration we will allow the resulting network to remain feed-forward. However, the methods described will work for recurrent networks.

Second, we changed the pooling layers from max pooling to average pooling. Again, computing max pooling would likely require lateral connections between neurons. Average pooling, on the other hand, allows the network to remain feedforward, since it is simply a weighted sum.

While not demonstrated here, some embodiments can generate an approximation to an arbitrary function (e.g. max pooling) by introducing a network topology into the spiking neurons (e.g., lateral inhibition) and simulating the effects of that topology on the input/output mapping provided by that group of neurons, for a wide range of static inputs to the neurons. This static input/output mapping can then be used during the standard training of the static network to approximate that computation.

The central modification being introduced here is using leaky integrate-and-fire neurons in place of standard non spiking ReLU units. In addition, we discuss training with noise as it plays an important role in getting good quality results.

Our network uses a modified leaky integrate-and-fire (LIF) neuron nonlinearity instead of the rectified linear nonlinearity. Past work has kept the rectified linear nonlinearity for the static network and substituted in the spiking integrate-and-fire (IF) neuron model in the dynamic network (see Y. Cao, Y. Chen, and D. Khosla, Spiking Deep Convolutional Neural Networks for Energy-Efficient Object Recognition, International Journal of Computer Vision, vol. 113, no. 1, pp. 5466, November 2014. and P. U. Diehl, D. Neil, J. Binas, M. Cook, S.-C. Liu, and M. Pfeiffer, Fast-Classifying, High-Accuracy Spiking Deep Networks Through Weight and Threshold Balancing, in IEEE International Joint Conference on Neural Networks (IJCNN), 2015.), since the static firing curve of the IF neuron model is a rectified line. This approach attempts to remove the dynamics of the neuron from having an effect on the network, rather than accounting for it during training. Often, very high firing rates are chosen, effectively making the dynamic model identical to the static model.

Our motivations for using the LIF neuron model are that a) it is more biologically realistic than the IF neuron model because IF models lack absolute and relative refractory periods, lack saturation effects, lack membrane time constant effects, and employ other simplifications, and b) it demonstrates that alternative models can be used in such networks. The LIF model is a canonical neural model that has been shown to be the reduction of a wide variety of complex conductance models. More generally, the methods applied here are transferable to any other spiking neuron model, and can be used to train a network for the idiosyncratic neuron types employed by some neuromorphic hardware. This includes neurons whose dynamic response functions are time-varying (e.g. adapting neurons), as long as a static approximation can be generated. We provide an example method here for generating such an approximation for LIF neurons. The method we demonstrate, as well as statistical modeling of dynamic responses, regression fitting methods, analytic reduction or other forms of generating static solutions for dynamic systems can be employed.

The LIF neuron dynamics are given by the equation $$\tau_{RC} \frac{dv(t)}{dt} = -v(t) + J(t) \quad (1)$$

where v(t) is the membrane voltage, J(t) is the input current, and $\tau_{RC}$ is the membrane time constant. When the voltage reaches $V_{th}=1$, the neuron fires a spike, and the voltage is held at zero for a refractory period of $\tau_{ref}$. Once the refractory period is finished, the neuron obeys Equation 1 until another spike occurs.

Given a constant input current J(t)=j, we can solve Equation 1 for the time it takes the voltage to rise from zero to one, and thereby find the steady-state firing rate $$r(j) = \begin{cases} \left[\tau_{ref} - \tau_{RC}\log\left(1 - \frac{V_{th}}{j}\right)\right]^{-1} & \text{if } j > V_{th} \\ 0 & \text{otherwise} \end{cases} \quad (2)$$

Theoretically, we should be able to train a deep neural network using Equation 2 as the static nonlinearity and make a reasonable approximation of the network in spiking neurons, assuming that the spiking network has a synaptic filter that sufficiently smooths a spike train to give a good approximation of the firing rate. The LIF steady state firing rate has the particular problem that the derivative approaches infinity as j→0+, which causes problems when employing backpropagation. To address this, we add smoothing to the LIF rate equation.

Figure 4:
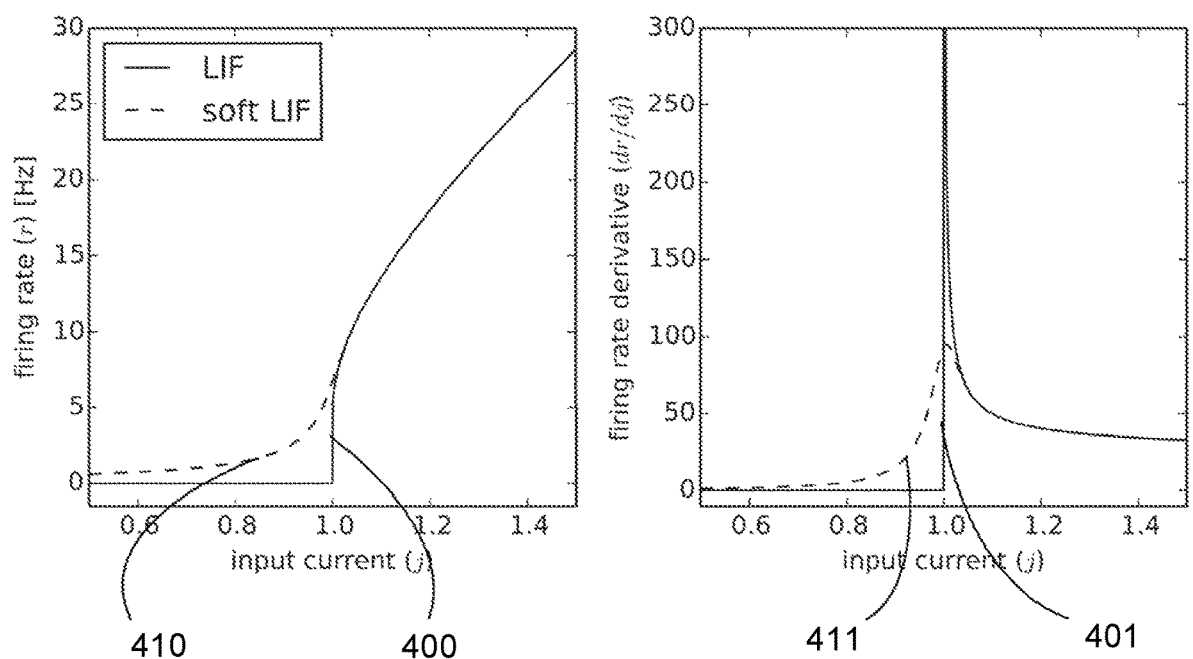
FIG. 4 is an illustration of a plot showing leaky integrate-and-fire (LIF) and soft LIF response functions as well as their derivatives.

Equation 2 can be rewritten as $$r(j) = \left[\tau_{ref} - \tau_{RC}\log\left(1 + \frac{V_{th}}{\rho(j - V_{th})}\right)\right]^{-1} \quad (3)$$

where ρ(x)=max(x, 0). If we replace this hard maximum with a softer maximum $\rho_1(x)=\log(1+e^x)$, then the LIF neuron loses its hard threshold and the derivative becomes bounded. Further, we can use the substitution $$\rho_2(x) = \gamma \log[1+e^{x/\gamma}] \quad (4)$$

to allow us control over the amount of smoothing, where $\rho_2(x) \to \max(x,0)$ as $\gamma \to 0$. FIG. 4 shows the result of this substitution, comparing the LIF and soft LIF response functions. The left panel shows the response functions themselves. The LIF function (400) has a hard threshold at $j=V_{th}=1$; the soft LIF function (410) smooths this threshold. The right panel shows the derivatives of the response functions. The hard LIF function (401) has a discontinuous and unbounded derivative at j=1; the soft LIF function has a continuous bounded derivative (411), making it amenable to use in backpropagation, the most common method used for training deep networks.

Training with Noise

Training neural networks with various types of noise on the inputs is not a new idea. However, its application in the case of spiking networks will be shown to be important, and hence is included in our description of the current invention as it is a unique application in this context.

In the past, denoising autoencoders have been successfully applied to datasets like MNIST, learning more robust solutions with lower generalization error than their non-noisy counterparts.

In a spiking neural network, the neuron receiving spikes in a connection (called the post-synaptic neuron) actually receives a filtered version of each spike. This filtered spike is called a post-synaptic current (or potential), and the shape of this signal is determined by the combined dynamics of the pre-synaptic neuron (e.g. how much neurotransmitter is released) and the post-synaptic neuron (e.g. how many ion channels are activated by the neurotransmitter and how they affect the current going into the neuron). The post-synaptic current dynamics can be characterized relatively well as a linear system with the impulse response given by the α-function:

$$\alpha(t) = \frac{t}{\tau_s} e^{-t/\tau_s}. \quad (5)$$

Note, however, that the methods described herein do not depend on there being a low-order linear system description available, as in this case. These methods will work for a wide variety of higher order and nonlinear filters.

The filtered spike train can be viewed as an estimate of the neuron activity. For example, if the neuron is firing regularly at 200 Hz, filtering spike train will result in a signal fluctuating around 200 Hz. We can view the neuron output as being 200 Hz, with some additional "noise" around this value. By training our static network with some random noise added to the output of each neuron for each training example, we can simulate the effects of using spikes on the signal received by the post-synaptic neuron.

Figure 5:
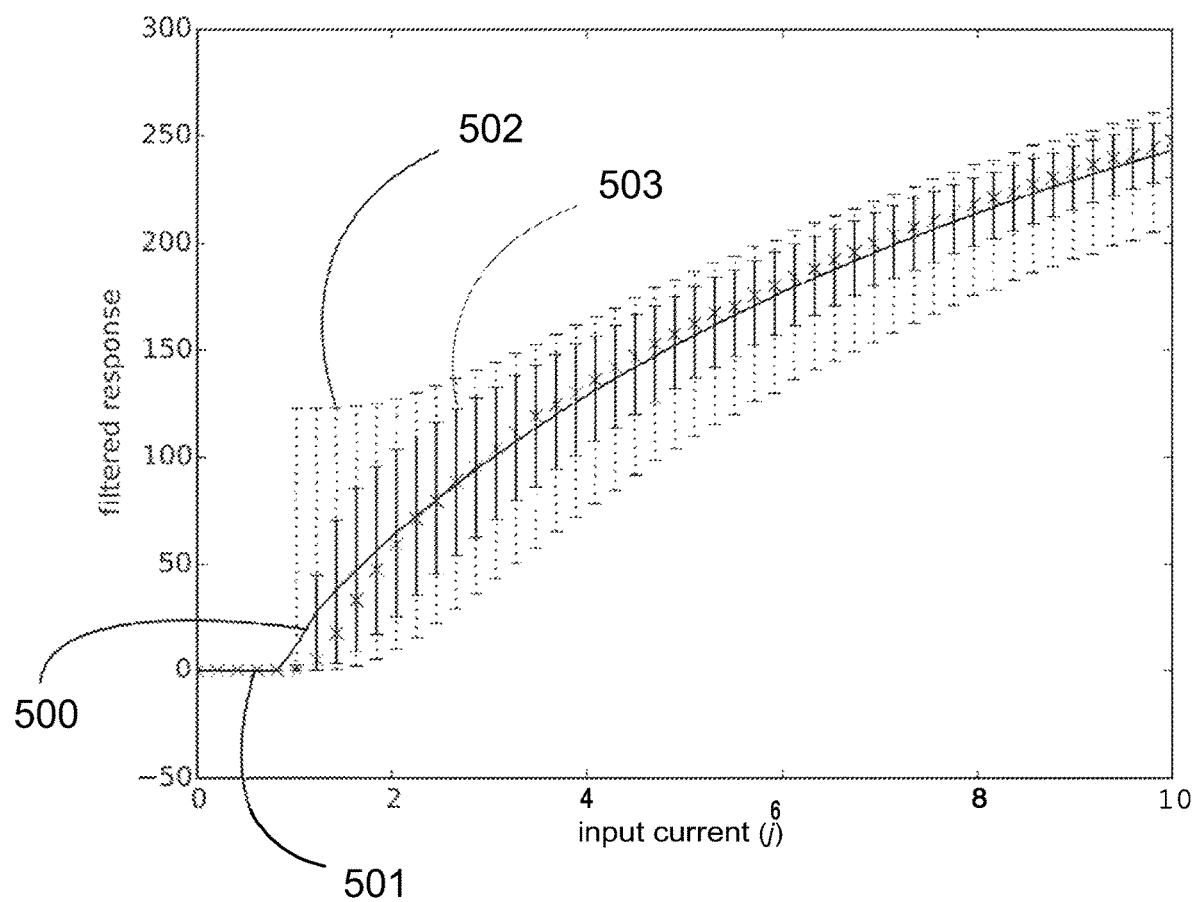
FIG. 5 is an illustration of a plot showing variability in filtered spike trains versus input current for the LIF neuron.

FIG. 5 shows how the variability of filtered spike trains depends on input current for the LIF neuron. Variability in filtered spike trains versus input current for the LIF neuron ($\tau_{RC}$=0.02, $\tau_{ref}$=0.004) can be seen here. The solid line (500) shows the mean of the filtered spike train (which matches the analytical rate of Equation 2), the 'x'-points (501) show the median, the solid error bars (503) show the 25th and 75th percentiles, and the dotted error bars (502) show the minimum and maximum. The spike train was filtered with an α-filter (Equation 5) with $\tau_s$=0.003 s. (Note that this is different than the $\tau_s$=0.005 used in simulation, to better display the variation.)

Since the impulse response of the α-filter has an integral of one, the mean of the filtered spike trains is equal to the analytical rate of Equation 2. However, the statistics of the filtered signal vary significantly across the range of input currents. Just above the firing threshold, the distribution is skewed towards higher firing rates (i.e. the median is below the mean), since spikes are infrequent so the filtered signal has time to return to near zero between spikes. At higher input currents, on the other hand, the distribution is skewed towards lower firing rates (i.e. the median is above the mean). In spite of this, we used a Gaussian distribution to generate the additive noise during training, for simplicity. Note, however, that the noise distribution can be of other forms, and will be more effective the more similar the distribution form is to the observed noise.

We found the average standard deviation to be approximately σ=10 across all positive input currents for an α-filter with $\tau_s$=0.005. The final steady-state soft LIF curve used in training is given by $$r(j) = \left[\tau_{ref} - \tau_{RC}\log\left(1 + \frac{V_{th}}{\rho(j - V_{th})}\right)\right]^{-1} + \eta(j) \quad (6)$$

where $$\eta(j) \sim \begin{cases} G(0, \sigma) & \text{if } j > V_{th} \\ 0 & \text{otherwise} \end{cases} \quad (7)$$

and ρ(·) is given by Equation 4.

Conversion to a Spiking Network

Finally, we convert the trained static network$^{th}$ to a dynamic spiking network. The parameters in the spiking network (i.e. weights and biases) are all identical to that of the static network. The convolution operation also remains the same, since convolution can be rewritten as simple connection weights (synapses) wij between pre-synaptic neuron i and post-synaptic neuron j.

Similarly, the average pooling operation can be written as a simple connection weight matrix, and this matrix can be multiplied by the convolutional weight matrix of the following layer to get direct connection weights between neurons. For computational efficiency, we actually compute the convolution and pooling separately.

Given the methods described above, for this embodiment, the only component of the network that actually changes, when moving from the static to the dynamic network, is the neurons themselves. The most significant change is that we replace the soft LIF rate model (Equation 6) with the LIF spiking model (Equation 1). We also remove the additive Gaussian noise used in training. There are, however, a plurality of ways that the change from the static to dynamic network may be achieved. One is using the same neuron model as described here. Another embodiment may use a different dynamic and static model (i.e., models generated from different neuron models), as long as they are sufficiently similar to compute the function trained for. Another embodiment would be to use more than one dynamic neuron to approximate the static function used during training.

When generating the dynamic network post-synaptic filters are also included in this example embodiment, which filter the incoming spikes before passing the resulting currents to the LIF neuron equation. It is not essential to add these filters. As stated previously, we use the α-filter for our synapse model, since it has both strong biological support, and removes a significant portion of the high-frequency variation produced by spikes. We pick the decay time constant $\tau_s$=5 ms, typical for excitatory AMPA receptors in the brain.

Results

We tested our network on the CIFAR-10 dataset. This dataset is composed of 60000 32×32 pixel labelled images from ten categories. We used the first 50000 images for training and the last 10000 for testing, and augmented the dataset by taking random 24×24 patches from the training images and then testing on the center patches from the testing images. This methodology is similar to Krizhevsky et al., except that they also used multiview testing where the classifier output is the average output of the classifier run on nine random patches from each testing image (increasing the accuracy by about 2%).

Table 1 shows the effect of each modification on the network classification error. Our original static network based on the methods of Krizhevsky et al. achieved 14.63% error, which is higher than the 11% achieved by the original paper since a) we are not using multiview testing, and b) we used a shorter training time (160 epochs versus 520 epochs).

Rows 1-5 in Table 1 show that each successive modification to make the network amenable to running in spiking neurons adds about 1-2% more error. Despite the fact that training with noise adds additional error to the static network, rows 6-8 of the table show that in the spiking network, training with noise pays off, though training with too much noise is not advantageous. Specifically, though training with σ=20 versus σ=10 decreased the error introduced when switching to spiking neurons (1% versus 2%), training with σ=20 versus σ=10 introduced an additional 2.5% error to the static network, making the final spiking network perform worse. In the interest of time, these spiking networks were all run on the same 1000-image random subset of the testing data. The last two rows of the table show the network with the optimal amount of noise (σ=10) trained for additional epochs (a total of 520 as opposed to 160), and run on the entire test set. Our spiking network achieves an error of 17.05% on the full CIFAR-10 test set, which is the best published result of a spiking network on this dataset.

TABLE 1

Effects of successive modifications to CIFAR-10 error. We first show the original static (non- spiking) network based on Krizhevsky et al. Modifications 1-5 are cumulative, which each one applied in addition to the previous ones. Rows 6-8 show the results of running static networks 3-5 in spiking neurons, respectively. Row 9 shows the best architecture for spiking implementation, Network 4, trained for additional epochs, and row 10 shows this highly-trained network in spiking neurons. This is the best spiking-network result on CIFAR-10 to date.

| # | Modification | CIFAR-10 error |
|---|---|---|
| 0 | Original static network based on Krizhevsky et al. | 14.63% |
| 1 | Above minus local contrast normalization | 15.27% |
| 2 | Above minus max pooling | 17.20% |
| 3 | Above with soft LIF | 18.92% |
| 4 | Above with training noise (σ = 10) | 19.74% |
| 5 | Above with training noise (σ = 20) | 22.22% |
| 6 | Network 3 (σ = 0) in spiking neurons | 25.1%[a] |
| 7 | Network 4 (σ = 10) in spiking neurons | 21.7%[a] |
| 8 | Network 5 (σ = 20) in spiking neurons | 23.2%[a] |
| 9 | Network 4 (σ = 10) with additional training | 16.01% |
| 10 | Network 9 (σ = 10) in spiking neurons | 17.05% |

[a]Results from the same random 1000-image subset of the testing set.

Comparing spiking networks is difficult, since the results depend highly on the characteristics of the neurons used. For example, neurons with very high firing rates, when filtered, will result in spiking networks that behave almost identically to their static counterparts. Using neurons with lower firing rates have much more variability in their filtered spike trains, resulting in noisier and less accurate dynamic networks. Nevertheless, we find it worthwhile to compare our results with those of Cao et al., who achieved 22.57% error on the CIFAR-10 dataset (as far as we know, the only other spiking network with published results on CIFAR-10). The fact that we achieved better results suggests that LIF neuron spiking networks can be trained to state-of-the-art accuracy and that adding noise during training helps improve accuracy.

Most spiking deep networks to date have been tested on the MNIST dataset. The MNIST dataset is composed of 70000 labelled hand-written digits, with 60000 used for training and 10000 reserved for testing. While this dataset is quickly becoming obsolete as deep networks become more and more powerful, it is only recently that spiking networks are beginning to achieve human-level accuracy on the dataset.

TABLE 2

Comparison of our network to the best published results for spiking networks on MNIST (see J. M. Brader, W. Senn, and S. Fusi, Learning real-world stimuli in a neural network with spike-driven synaptic dynamics, Neural Computation, vol. 19, pp. 28812912, 2007 AND C. Eliasmith, T. C. Stewart, X. Choo, T. Bekolay, T. DeWolf, C. Tang, and D. Rasmussen, A Large-Scale Model of the Functioning Brain, Science, vol. 338, no. 6111, pp. 1202 1205, November 2012 AND E. Neftci, S. Das, B. Pedroni, K. Kreutz-Delgado, and G. Cauwenberghs, Event-driven contrastive divergence for spiking neuromorphic systems, Frontiers in Neuroscience, vol. 7, no. 272, 2013 AND P. OConnor, D. Neil, S. C. Liu, T. Delbruck, and M. Pfeiffer, Real-time classification and sensor fusion with a spiking deep belief network, Frontiers in Neuroscience, vol. 7, January 2013 AND D. Garbin, O. Bichler, E. Vianello, Q. Rafhay, C. Gamrat, L. Perniola, G. Ghibaudo, and B. DeSalvo, Variability-tolerant convolutional neural network for pattern recognition applications based on OxRAM synapses, in IEEE international Electron Devices Meeting (IEDM), 2014, pp. 28.4.128.4.4). Our network performs on par with state-of-the-art reulls, demonstrating that state-of-the-art spiking networks can be trained with LIF neurons.

| Source | MNIST error |
|---|---|
| Brader et al. | 3.5% (1.3% misclassified, 2.2% not classified) (IF) |
| Eliasmith et al. | 6% (LIF) |
| Neftci et al. | 8.1% (LIF) |
| O'Connor et al. | 2.52% (sigmoid-binary), 5.91% (LIF) |
| Garbin et al. | 1.7% (IF) |
| Diehl et al. | 1.36%[a] (IF) |
| Our network | 1.63% (LIF) |

[a]Their best result for a non-convolutional network.

We trained an example network on the MNIST dataset. This network used layer-wise pretraining of non-convolutional denoising autoencoders, stacked and trained as a classifier. This network had two hidden layers of 500 and 200 nodes each, and was trained on the unaugmented dataset. Despite the significant differences between this network and the network used on the CIFAR-10 dataset, both networks use spiking LIF neurons and are trained with noise to minimize the error caused by the filtered spike train variation. Table 2 shows a comparison between our network and the best published results on MNIST. Our network significantly outperforms the best results using LIF neurons, and is on par with those of IF neurons. This demonstrates that state-of-the-art networks can be trained with LIF neurons.

These example results demonstrate that the methods described in this invention allow us to train accurate deep convolutional networks for image classification using more biologically accurate leaky integrate-and-fire (LIF) neurons, as opposed to the traditional rectified-linear or sigmoid neurons. Such a network can be run in spiking neurons, and training with noise decreases the amount of error introduced when running in spiking versus rate neurons.

The methods described that employ smoothing the neuron response function is applicable to neuron types other than the LIF neuron. Many other neuron types have discontinuous response functions (e.g. the FitzHugh-Nagumo neuron), and our smoothing method allows such neurons to be used in deep convolutional networks. We found that there was very little error introduced by switching from the soft response function to the hard response function with LIF neurons for the amount of smoothing that we used. However, for neurons with harsh discontinuities that require more smoothing, it may be possible to slowly relax the smoothing over the course of the training so that, by the end of the training, the smooth response function is arbitrarily close to the hard response function.

Our example networks also demonstrate that training with noise on neuron outputs can decrease the error introduced when transitioning to spiking neurons. Training with noise on neuron outputs improved the performance of the spiking network considerably (the error decreased by 3.4%). This is because noise on the output of the neuron simulates the variability that a spiking network encounters when filtering a spike train. There is a tradeoff between too little training noise, where the resultant dynamic network is not robust enough against spiking variability, and too much noise, where the accuracy of the static network is decreased. Since the variability produced by spiking neurons is not Gaussian (FIG. 5), our additive Gaussian noise is a rough approximation of the variability that the spiking network will encounter. Using these same methods we can include training with noise that is more representative of the variability seen in spiking networks, to accommodate both the non-Gaussian statistics at any particular input current, and the changing statistics across input currents.

Our example networks perform favourably with other spiking networks, achieving the best published result for a spiking network on CIFAR-10, and the best result for a LIF neuron spiking network on MNIST.

Similar methods that extend those explicitly tested here can be used to include max-pooling and local contrast normalization layers in spiking networks. Computing these functions in spiking networks can exploit the methods like those described by Eliasmith and Anderson (see C. Eliasmith and C. H. Anderson, Neural Engineering: Computation, Representation, and Dynamics in Neurobiological Systems. Cambridge, Mass.: MIT Press, 2003). Networks could also be trained offline as described here and then fine-tuned online using a spike-timing-dependent plasticity (STDP) rule, such as the prescribed error sensitivity (PES) rule (see T. Bekolay), to help further reduce errors associated with converting from rate-based to spike-based networks, while avoiding difficulties with training a network in spiking neurons from scratch.

The aforementioned embodiments have been described by way of example only. The invention is not to be considered limiting by these examples and is defined by the claims that now follow.

The invention claimed is:

1. A computer-implemented method for implementing spiking neural network computations, the method comprising:
   defining a dynamic node response function that exhibits spikes, where spikes are temporal nonlinearities for representing a spike rate as state over time;
   defining a static representation of said dynamic node response function, said static representation comprising a static response function that maps directly from an input state to an output state;
   using the static representation of the dynamic node response function to train a neural network;
   deriving neural connection weights from the step of using the static representation of the dynamic node response function to train the neural network,
   wherein the derived connection weights are used in a dynamically implemented spiking neural network to compute a function trained for by running a dynamic neural model,
   wherein each neuron is connected to other neurons by synaptic dynamics weighted by the connection weights determined during training;
   implementing the spiking neural network on a system consisting of a plurality of nonlinear components whose individual outputs are combined together further comprising smoothing of any static nonlinearities in the static representation of the node response function such that the dynamic node response function is used to train the neural network with backpropagation.

2. The method of claim 1, wherein the connection weights are determined using a neural compiler.

3. The method of claim 1, wherein the neural network includes an adaptive rule that optimizes initially determined weights.

4. The method of claim 1, wherein the network is trained with noise on the output of the static node response function, and where the distribution of the noise is tuned to account for the variability that is introduced when replacing the static node response function with the dynamic node response function.

5. The method of claim 1, wherein the network computation includes additional nonlinearities and/or linearities.

6. A system for pattern classification, data representation, or signal processing in spiking neural networks, the system comprising:
   a computer processor executing computer-readable instructions stored on a non-transitory computer readable medium, said computer-readable instructions carrying out a method for implementing spiking neural network computations when executed by said computer processor, the method comprising:
      defining a dynamic node response function that exhibits spikes, where spikes are temporal nonlinearities for representing a spike rate as state over time;
      defining a static representation of said dynamic node response function, said static representation comprising a static response function that maps directly from an input state to an output state;
      using the static representation of the dynamic node response function to train a neural network;
      deriving neural connection weights from the step of using the static representation of the dynamic node response function to train the neural network,
      wherein the derived connection weights are used in a dynamically implemented spiking neural network to compute a function trained for by running a dynamic neural model,
      wherein each neuron is connected to other neurons by synaptic dynamics weighted by the derived connection weights determined during training of the neural network; and
      implementing the spiking neural network on a plurality of nonlinear components whose individual outputs are combined together; and
      smoothing of any static nonlinearities in the static representation of the node response function such that the dynamic node response function is used to train the neural network with backpropagation
   a data structure stored on the non-transitory computer-readable medium, and modified based on said computer processor executing said computer-readable instructions, the data structure consisting of:
      one or more input layers presenting a vector of 1 or greater dimensions;
      one or more output layers generating a vector representation of the data presented at the one or more input layers; and
      one or more intermediate layers coupled via weight matrices to at least one of the input layers, an intermediate, and the output layers, wherein each layer comprises a plurality of nonlinear components, wherein each nonlinear component is configured to generate a spike, wherein a spike is defined as temporally brief outputs at each moment in time in response to an input, and each layer is coupled to the layer's output by at least one weighted coupling, wherein the output from each nonlinear component is weighted by the connection weights of corresponding weighted couplings and the weighted outputs are provided to the layer's output, wherein an input to the plurality of nonlinear components is either discrete or continuous in time and space;

wherein the input to the plurality of nonlinear components is a scalar or a multidimensional vector.

7. The system of claim 6 including neuromorphic hardware, or software.

8. A computer system comprising computer readable instructions stored on a non-transitory computer readable medium, which when executed by a computer processor:

define a node response function that exhibits spikes, where spikes are temporal nonlinearities for representing a spike rate as state over time;

define a static representation of said node response function, said static representation comprising a static response function that maps directly from an input state to an output state;

use the static representation of the node response function to train a neural network;

further use a smoothing function to smooth any static nonlinearities in the static representation of the node response function such that the node response function is used to train the neural network with backpropagation;

wherein the computer readable instructions executed by the processor further derive neural connection weights from the using of the static representation of the node response function to train the neural network, wherein the derived neural connection weights are used in a dynamically implemented spiking neural network to compute a function trained for by running a dynamic neural model, wherein each neuron is connected to other neurons by synaptic dynamics weighted by the derived neural connection weights determined during training of the neural network, and wherein the system consists of a plurality of nonlinear components whose individual outputs are combined together.

9. The computer system of claim 8, wherein the connection weights are determined using a neural compiler.

10. The computer system of claim 8, wherein computer readable instructions further include an adaptive rule that optimizes initially determined weights.

11. The computer system of claim 8, wherein computer readable instructions further cause the network to be trained with noise that accounts for variability introduced by neural spiking.

* * * * *